(12) United States Patent
Takatani et al.

(10) Patent No.: US 7,599,169 B2
(45) Date of Patent: Oct. 6, 2009

(54) SOLID ELECTROLYTIC CAPACITOR AND METHOD OF MANUFACTURING SOLID ELECTROLYTIC CAPACITOR

(75) Inventors: Kazuhiro Takatani, Takatsuki (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 434 days.

(21) Appl. No.: 11/390,349

(22) Filed: Mar. 28, 2006

(65) Prior Publication Data
US 2006/0215354 A1   Sep. 28, 2006

(30) Foreign Application Priority Data
Mar. 28, 2005  (JP)  ............................. 2005-091998
Feb. 21, 2006  (JP)  ............................. 2006-044391

(51) Int. Cl.
*H01G 9/00*   (2006.01)
(52) U.S. Cl. .................. 361/523; 361/516; 361/525; 361/528; 361/529; 361/540; 29/25.01; 29/25.03
(58) Field of Classification Search ............... 361/523, 361/525–541, 516–519; 29/25.01, 25.06, 29/25.03
See application file for complete search history.

(56) References Cited

U.S. PATENT DOCUMENTS

| | | | | |
|---|---|---|---|---|
| 6,042,740 A * | 3/2000 | Uehara et al. | ............... | 252/62.2 |
| 6,243,256 B1 * | 6/2001 | Furuta et al. | ................ | 361/528 |
| 6,333,844 B1 * | 12/2001 | Nakamura | ................... | 361/523 |
| 6,343,005 B1 * | 1/2002 | Tadanobu et al. | ........... | 361/532 |
| 6,449,140 B1 * | 9/2002 | Sakai et al. | .................. | 361/532 |
| 6,462,936 B1 * | 10/2002 | Fujimoto et al. | ............ | 361/525 |
| 6,671,167 B2 * | 12/2003 | Araki et al. | .................. | 361/523 |
| 6,674,635 B1 * | 1/2004 | Fife et al. | .................... | 361/523 |
| 6,791,822 B2 * | 9/2004 | Kochi et al. | .................. | 361/523 |
| 6,890,363 B1 * | 5/2005 | Sakai et al. | ................. | 29/25.03 |
| 6,894,890 B2 * | 5/2005 | Takatani et al. | ............. | 361/532 |
| 6,912,118 B2 * | 6/2005 | Matsuzaki et al. | .......... | 361/525 |
| 6,982,865 B2 * | 1/2006 | Kawata et al. | .............. | 361/525 |

FOREIGN PATENT DOCUMENTS

JP   05-159987   6/1993

* cited by examiner

*Primary Examiner*—Nguyen T Ha
(74) *Attorney, Agent, or Firm*—NDQ & M Watchstone LLP

(57) ABSTRACT

An aspect of the present invention provides a method of manufacturing a solid electrolytic capacitor. The solid electrolytic capacitor includes an anode made of valve action metal, a dielectric layer, a solid electrolytic layer, a cathode conductive layer, and a cathode terminal. The method forms the cathode conductive layer by forming a conductive paste and conductive adhesive between the solid electrolytic layer and the cathode terminal and then simultaneously hardening the conductive paste and the conductive adhesive.

20 Claims, 6 Drawing Sheets

SOLID ELECTROLYTIC CAPACITOR AND METHOD OF MANUFACTURING SOLID ELECTROLYTIC CAPACITOR

CROSS REFERENCE TO RELATED APPLICATIONS

This application is based upon and claims the benefit of priority from the prior Japanese Patent Applications Nos. P2005-091998 filed on Mar. 28, 2005, and P2006-044391 filed on Feb. 21, 2006, the entire contents of which are incorporated herein by reference.

BACKGROUND OF THE INVENTION

1. Field of the Invention

The present invention relates to a solid electrolytic capacitor including an anode of valve action metal, a dielectric layer, a solid electrolytic layer, and a cathode conductive layer, as well as a method of manufacturing such a solid electrolytic capacitor.

2. Description of Related Art

An example of a solid electrolytic capacitor is disclosed in Japanese Unexamined Patent Application Publication No. Hei-05-159987. This capacitor consists of a capacitor element having an anode of valve action metal. On the surface of the anode, the capacitor element sequentially includes a dielectric layer that is an oxide of the valve action metal, a solid electrolytic layer made of conductive polymer, a conductive carbon layer made of, for example, graphite, and a conductive layer made by hardening and drying conductive paste. The capacitor element is connected to a cathode terminal with a conductive adhesive. With the cathode terminal partly protruding outside, the capacitor element and cathode terminal are sealed with a casing made of, for example, epoxy resin.

Solid electrolytic capacitors of this type are widely used in power sources of CPUs and peripheral circuits of electronic appliances such as notebook computers, desktop computers, cellular phones, portable information terminals, digital cameras, and video information devices. In a power source, the solid electrolytic capacitor is used to smooth source power and remove high-frequency noise. In a switching regulator that drives a switching element at frequencies of several tens to hundreds of kilohertz, the solid electrolytic capacitor is used to remove high-frequency noise produced by the switching element. Since conductive polymers have been used for the solid electrolytic layers of the solid electrolytic capacitors, the capacitors have become smaller in size, lower in profile, and higher in capacity. Due to this, the solid electrolytic capacitors are widely used in the field of electronic information devices.

The solid electrolytic capacitors used for electronic information devices are required to reduce resistance components as small as possible. The resistance components to be reduced include $1/\omega C$ ($\omega=2\pi f$, where f is a frequency), ESR (equivalent series resistance), and ESL (equivalent series inductance). Among them, ESR plays a major role in adverse affect in a high-frequency region. ESR is a total of resistance values of the anode, solid electrolytic layer, conductive carbon layer, conductive paste layer, and conductive adhesive layer, and the like in the solid electrolytic capacitor. Minimizing ESR is important for the solid electrolytic capacitors, in particular, for those used in high-frequency regions.

To reduce the ESR of solid electrolytic capacitors, various techniques have been developed. The inventor of the present invention has found that a factor of increasing the ESR of a solid electrolytic capacitor is a two-layer structure employed for a cathode conductive layer that connects a solid electrolytic layer to a cathode terminal. The cathode conductive layer of two-layer structure is made of a conductive paste layer and a conductive adhesive layer, and an interface between the two layers produces contact resistance that increases ESR in high-frequency regions.

SUMMARY OF THE INVENTION

The present invention is to provide a solid electrolytic capacitor capable of minimizing ESR, and a method of manufacturing such a solid electrolytic capacitor.

An aspect of the present invention provides a solid electrolytic capacitor including an anode made of valve action metal. On the anode, a dielectric layer, a solid electrolytic layer, and a cathode conductive layer are formed in this order. The cathode conductive layer is connected to a cathode terminal. The cathode conductive layer is a single layer containing metal particles.

The "single layer" according to the present invention is a layer consisting of only one layer. Then a layer which contains layers including same metal particles but different density of metal particles each other may not be a single layer. A cathode conductive layer having a layered structure of plurality of layers containing substantially different concentrations of metal particles is not the "single layer" according to the present invention.

The cathode conductive layer of the solid electrolytic capacitor according to the first aspect of the present invention is a single layer containing metal particles. Unlike the cathode conductive layer according to the related art consisting of a conductive paste layer and a conductive adhesive layer, the first aspect of the present invention involves no interfacial contact resistance between two layers, and therefore, can minimize ESR and realize excellent electric characteristics in high-frequency regions. The first aspect of the present invention is effective to reduce high-frequency noise in electronic appliances such as computers and portable information terminals that operate at high frequencies.

It is preferable that the cathode terminal of the solid electrolytic capacitor includes a plurality of cathode faces, and the cathode conductive layer is connected to the cathode faces.

Connecting the cathode conductive layer to the plurality of cathode faces to increase a cathode contact area, reduce ESR, and strengthen connection between the cathode conductive layer and the cathode terminal.

It is preferable that the cathode terminal includes a cathode case having inner faces on which the cathode faces are formed. This aspect makes connection work of the cathode conductive layer to the cathode terminal easier.

It is preferable that the cathode conductive layer has a density in the range of 4.0 g·cm$^{-3}$ to 15.0 g·cm$^{-3}$. This range is preferable to reduce ESR. A more preferable density of the cathode conductive layer is in the range of 5.0 g·cm$^{-3}$ to 14.0 g·cm$^{-3}$. This range is more effective to reduce ESR. If the density of the cathode conductive layer is less than 4.0 g·cm$^{-3}$ the conductivity of the cathode conductive layer decreases to increase ESR, and if it is over 15.0 g·cm$^{-3}$, conductive paste used for the cathode conductive layer must use a very small amount of solvent. The very small amount of solvent causes little evaporation to thicken the cathode conductive layer when dried, thereby increasing ESR.

It is preferable that the metal particles contained in the cathode conductive layer are particles of at least one selected from the group consisting of gold, silver, copper, platinum, tin, indium, palladium, nickel, and an alloy thereof.

It is preferable that a conductive carbon layer containing carbon particles is formed between the solid electrolytic layer and the cathode conductive layer of the solid electrolytic capacitor. This aspect can further reduce contact resistance on the solid electrolytic layer.

Another aspect of the present invention provides a method of manufacturing a solid electrolytic capacitor. The solid electrolytic capacitor includes an anode made of valve action metal, a dielectric layer, a solid electrolytic layer, a cathode conductive layer, and a cathode terminal. The method forms the cathode conductive layer by forming a conductive film between the solid electrolytic layer and the cathode terminal and by hardening the conductive film.

The method according to above aspect of the present invention forms a conductive film between the solid electrolytic layer and the cathode terminal and hardens the conductive film, to thereby form the cathode conductive layer that is a single layer containing metal particles. The solid electrolytic capacitor manufactured according to this aspect demonstrates small ESR in high-frequency ranges. The aspect connects the cathode conductive layer to a plurality of cathode faces of the cathode terminal, thereby increasing a contact area between the cathode conductive layer and the cathode terminal, reducing ESR, and improving connection strength.

It is preferable that forming the cathode conductive layer includes applying conductive paste onto the solid electrolytic layer, applying a conductive adhesive onto the cathode terminal, coupling the conductive paste and adhesive together, and simultaneously hardening the conductive paste and adhesive.

It is preferable that the conductive paste and adhesive used to form the cathode conductive layer are made of the same material.

It is preferable that the method of forming a solid electrolytic capacitor further includes forming a plurality of cathode faces on the cathode terminal and connecting the cathode conductive layer to the plurality of cathode faces.

It is preferable that the conductive paste applied to the solid electrolytic layer includes a binder made of epoxy, urethane, acryl, or polyimide resin. The conductive adhesive applied to the cathode terminal includes a conductive filler made of gold, silver, nickel, or carbon and a binder made of epoxy, urethane, acryl, or polyimide resin.

DETAILED DESCRIPTION OF EMBODIMENTS

Figure 1:
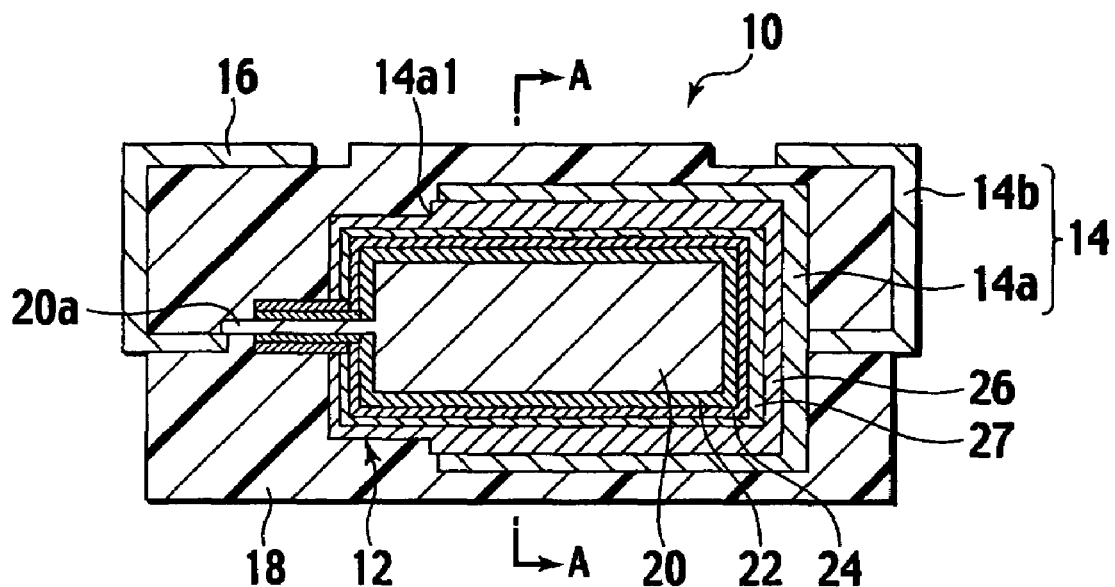
FIG. 1 is a schematic view generally showing the solid electrolytic capacitor.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 2:
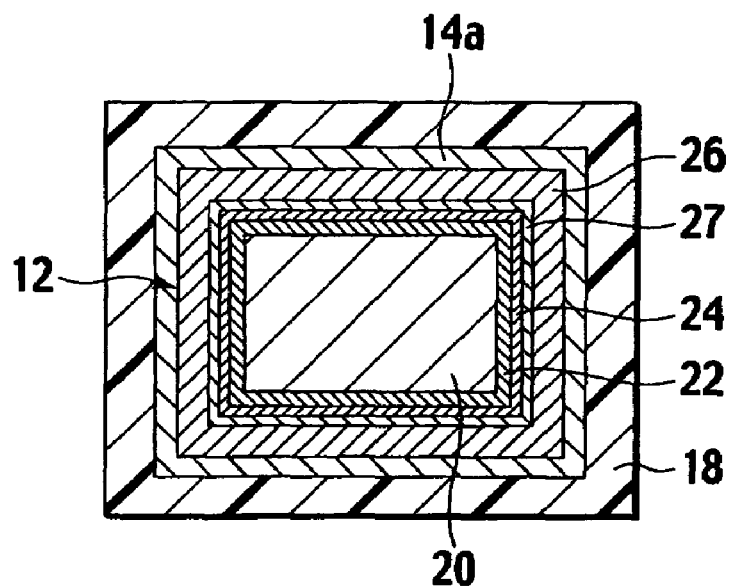
FIG. 2 is a sectional view taken along a line A-A of FIG. 1.
Figure 3:
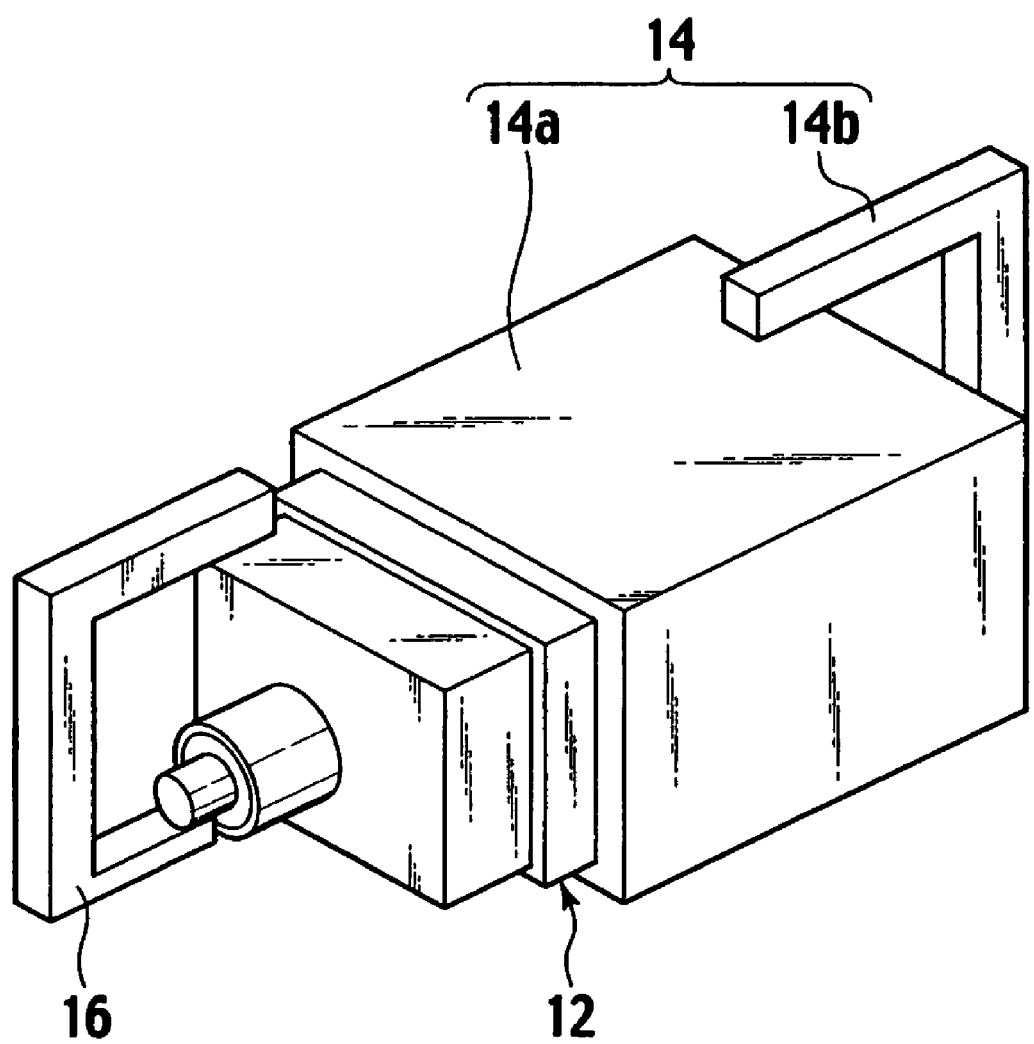
FIG. 3 is an external view showing the solid electrolytic capacitor of FIG. 1.

A solid electrolytic capacitor according to an embodiment of the present invention will be explained in detail with reference to FIGS. 1 to 3, in which FIG. 1 is a schematic view generally showing the solid electrolytic capacitor, FIG. 2 is a sectional view taken along a line A-A of FIG. 1, and FIG. 3 is an external view showing the solid electrolytic capacitor of FIG. 1. The solid electrolytic capacitor 10 is a surface-mounting-type conductive polymeric solid electrolytic capacitor and includes a capacitor element 12, a cathode terminal 14, an anode terminal 16, and a resin sheath 18.

The cathode terminal 14 has a cathode case 14a and a cathode lead terminal 14b to take the cathode outside. The cathode case 14a has a bottomed structure having an open end 14a1. The cathode case 14a has four inner side faces and one inner bottom face. These five inner faces of the cathode case 14a serve as cathode faces. The names used for these parts of the cathode terminal 14 are tentative for convenience of explanation, and any of the parts may be a cathode terminal.

The capacitor element 12 has an anode 20. On the anode 20, there are sequentially formed a dielectric oxide film (dielectric layer) 22, a solid electrolytic layer 24, a conductive carbon layer 27, and a cathode conductive layer 26. The cathode conductive layer 26 is a single layer containing silver particles. The silver particles are an example of the metal particles according to the present invention.

The capacitor element 12 is accommodated in the 14a, and the cathode conductive layer 26 is connected to the cathode faces, i.e., the inner faces of the cathode case 14a. The anode 20 has an anode lead 20a that is connected to the anode terminal 16. The capacitor element 12 is airtightly sealed with the resin sheath 18.

The anode 20, dielectric oxide film 22, solid electrolytic layer 24, conductive carbon layer 27, and cathode conductive layer 26 that form the capacitor element 12 will be explained in detail.

The anode 20 has a porous sintered body made of tantalum powder. The tantalum powder is pressed into a shape of the anode 20 and is sintered under a reduced pressure and high temperature, to form the porous sintered body. The porous sintered body of tantalum powder has a large surface area to realize a large capacity. The anode 20 is not limited to the porous sintered body. It may be a foil body, or may be made of any other valve action metal such as aluminum, niobium, titanium, or a combination thereof.

The dielectric oxide film 22 is made by anodic oxidizing the surface of the anode 20 in an aqueous solution of, for example, phosphoric acid. According to the embodiment, the dielectric oxide film 22 is made of tantalum oxide. If the anode 20 is made of another valve action metal such as aluminum, niobium, or titanium, the dielectric oxide film 22 is an oxide of aluminum, niobium, or titanium.

The solid electrolytic layer 24 is made of conductive polymer such as polypyrrole, polythiophene, and polyaniline. Although the solid electrolytic layer 24 is made of conductive polymer according to the embodiment, this does not limit the present invention. The solid electrolytic layer 24 may be made of any other material such as manganese dioxide.

The conductive carbon layer 27 is made of conductive carbon particles containing, for example, graphite. The conductive carbon layer 27 may be made by applying a conductive carbon solution containing conductive carbon particles having a predetermined diameter onto the solid electrolytic layer 24 and by drying the same.

Figure 4A:
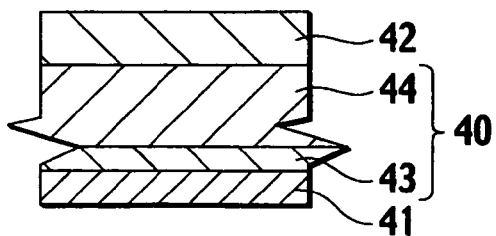
FIG. 4A is a sectional view showing a cathode conductive layer 40 of a solid electrolytic capacitor according to a related art.
Figure 4B:
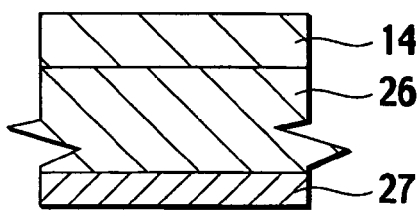
FIG. 4B is a sectional view showing the cathode conductive layer 26 according to the embodiment of the present invention.
Figure 4C:
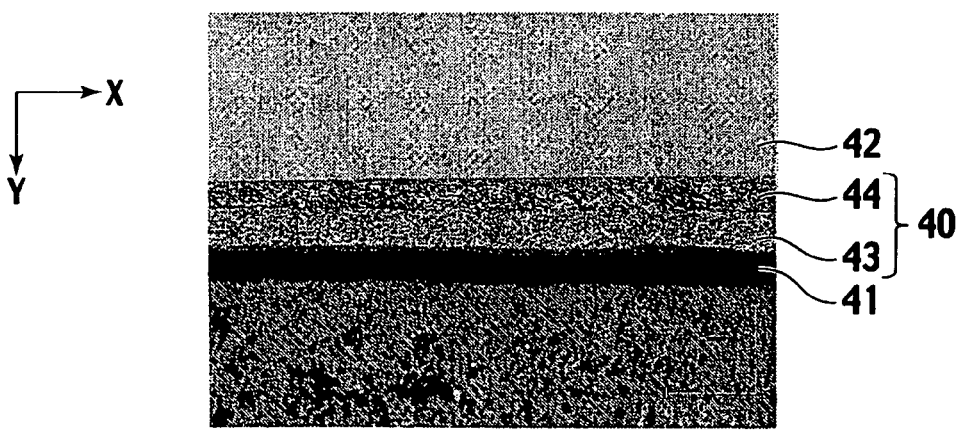
FIG. 4C is a SEM (scanning electron microscope) photograph showing the related art of FIG. 4A.
Figure 4D:
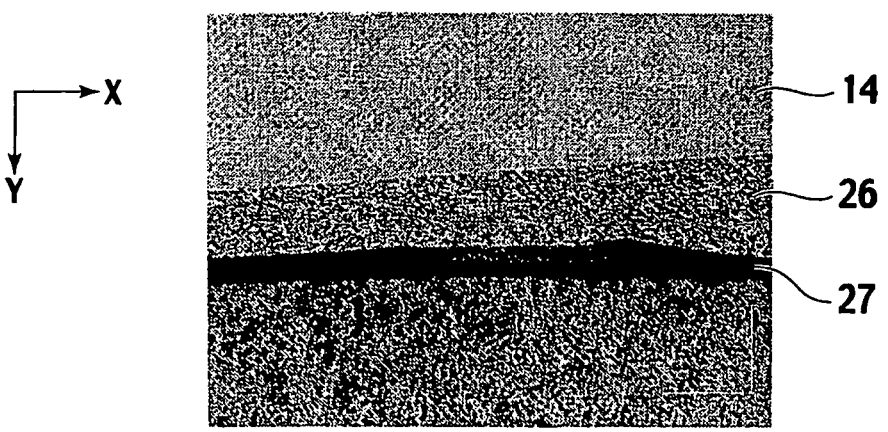
FIG. 4D is a SEM photograph showing the embodiment of FIG. 4B.
Figure 7A:
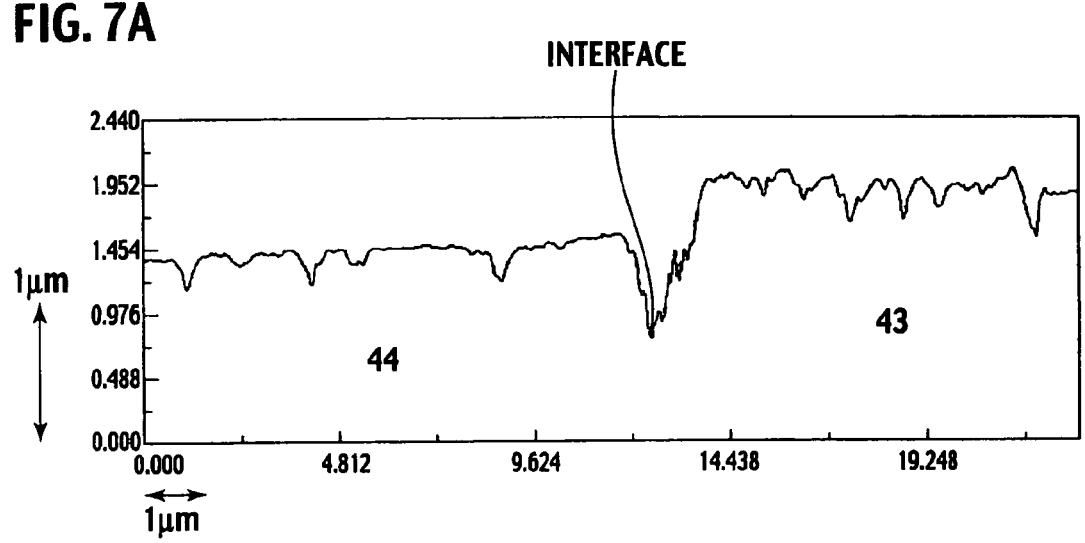
FIG. 7A is a sectional profile in Y-direction showing an interface between a silver paste layer 43 and a silver adhesive layer 44 of the related art of FIG. 4C.
Figure 7B:
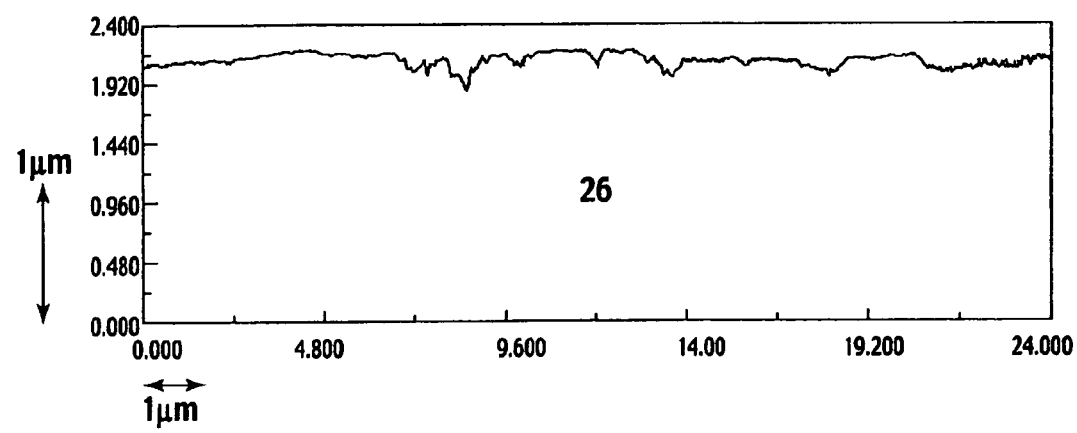
FIG. 7B is a sectional profile in Y-direction showing the cathode conductive layer 26 of the embodiment of FIG. 4D.

The cathode conductive layer 26 will be explained with reference to FIGS. 4A to 4D, 7A, and 7B in which FIG. 4A is a sectional view showing a cathode conductive layer 40 of a solid electrolytic capacitor according to a related art, FIG. 4B is a sectional view showing the cathode conductive layer 26 according to the embodiment of the present invention, FIG. 4C is a SEM (scanning electron microscope) photograph showing the related art of FIG. 4A, FIG. 4D is a SEM photograph showing the embodiment of FIG. 4B, FIG. 7A is a sectional profile in Y-direction showing an interface between a silver paste layer 43 and a silver adhesive layer 44 of the related art of FIG. 4C, and FIG. 7B is a sectional profile in Y-direction showing the cathode conductive layer 26 of the embodiment of FIG. 4D.

In FIG. 4A, the solid electrolytic capacitor according to the related art includes a conductive carbon layer 41 and a cathode terminal 42 between which the cathode conductive layer 40 is arranged. According to the related art, the cathode conductive layer 40 has a two-layer structure including the silver paste layer 43 and silver adhesive layer 44.

In FIG. 4B, the solid electrolytic capacitor according to the embodiment of the present invention includes the conductive carbon layer 27 and the cathode terminal 14 between which the cathode conductive layer 26 is formed. According to the embodiment, the cathode conductive layer 26 has a single-layer structure containing metal particles.

According to the related art of FIG. 4A, the cathode conductive layer 40 has the two-layer structure of the silver paste layer 43 and silver adhesive layer 44. An interface between the layers 43 and 44 has high contact resistance to increase ESR in high-frequency regions.

On the other hand, the cathode conductive layer 26 of FIG. 4B according to the embodiment of the present invention is a single layer containing metal particles. Namely, the embodiment involves no interface of the related art formed between the silver paste layer 43 and the silver adhesive layer 44. Accordingly, the solid electrolytic capacitor of the embodiment demonstrates low ESR in high-frequency regions.

To realize the single cathode conductive layer 26, the embodiment provides the cathode terminal 14 with a casing configuration so that the capacitor element 12 is easily and strongly connected to the cathode terminal 14.

The embodiment applies a silver adhesive 28b to all or any number of the five inner faces of the cathode case 14a.

Figure 5:
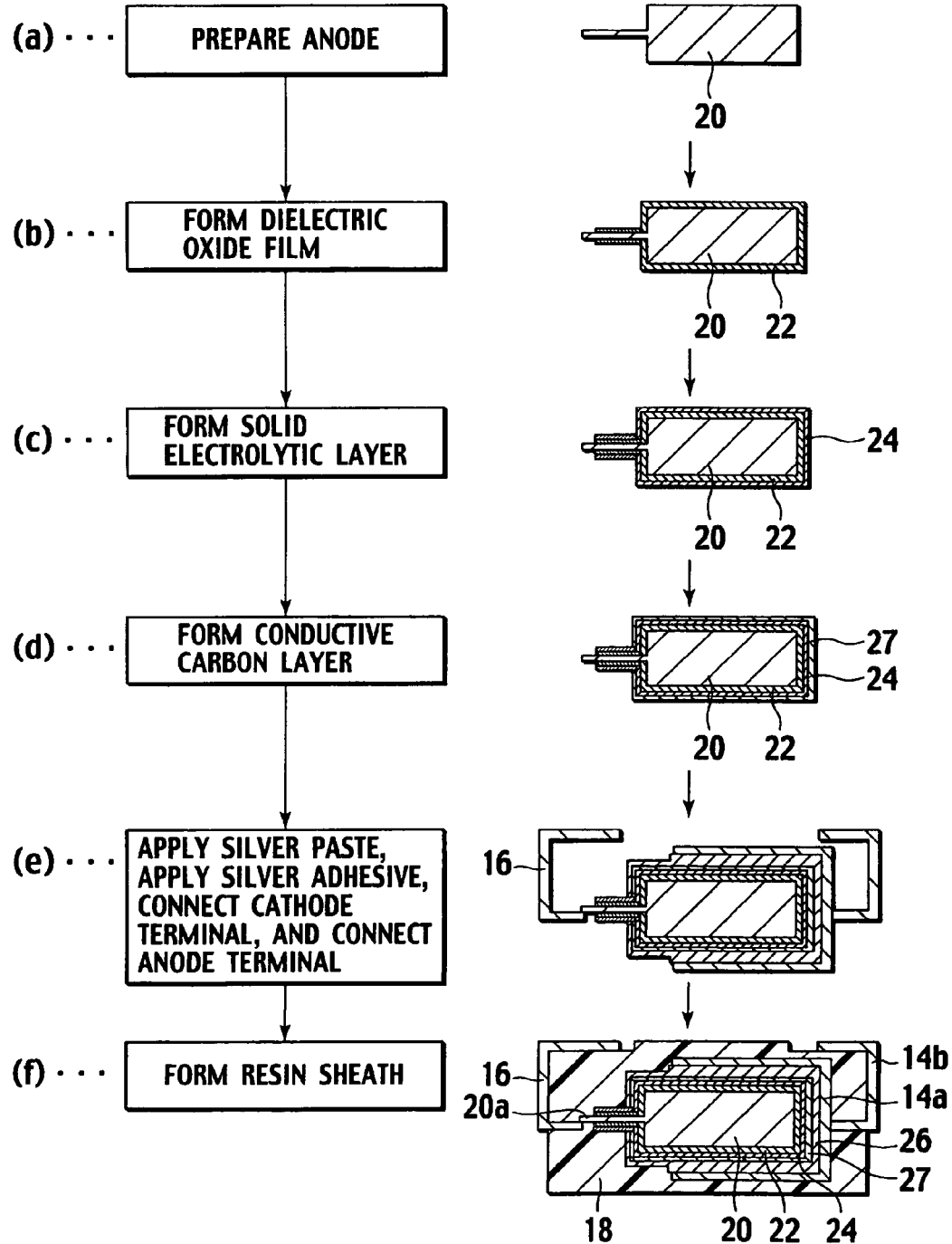
FIGS. 5 and 6 show an embodiment of a method of manufacturing the solid electrolytic capacitor of the above-mentioned embodiment.

FIGS. 5 and 6 show an embodiment of a method of manufacturing the solid electrolytic capacitor of the above-mentioned embodiment.

In FIG. 5, process (a) forms the anode 20.

Process (b) forms the dielectric oxide film 22 on the anode 20.

Process (c) forms the solid electrolytic layer 24 on the dielectric oxide film 22.

Process (d) forms the conductive carbon layer 27 on the solid electrolytic layer 24, thereby preparing a layered body with its top surface being the conductive carbon layer 27.

Figure 6A:
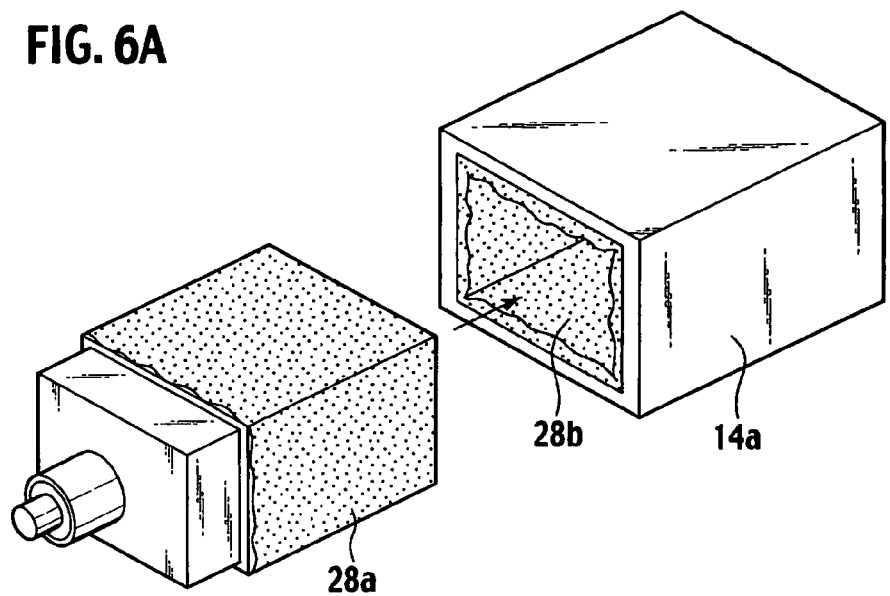

In FIG. 6A, silver paste 28a containing silver particles is applied to the conductive carbon layer 27. The silver paste is an example of the conductive paste according to the present invention. The silver adhesive 28b containing silver particles is applied to the five inner faces including the four inner side faces and one inner bottom face of the cathode case 14a. The silver adhesive 28b is an example of the conductive adhesive according to the present invention.

Figure 6B:
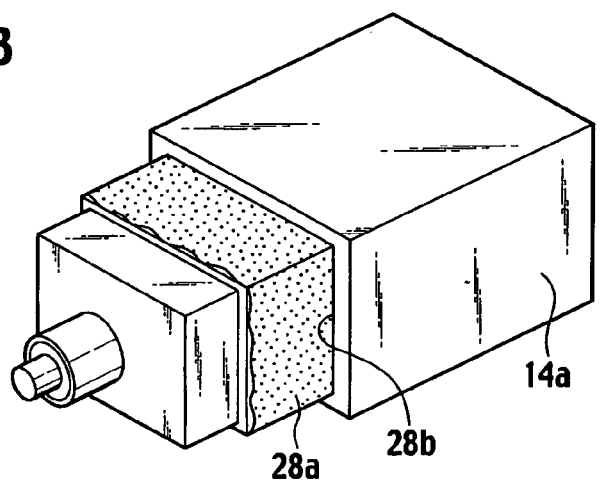
Figure 6C:
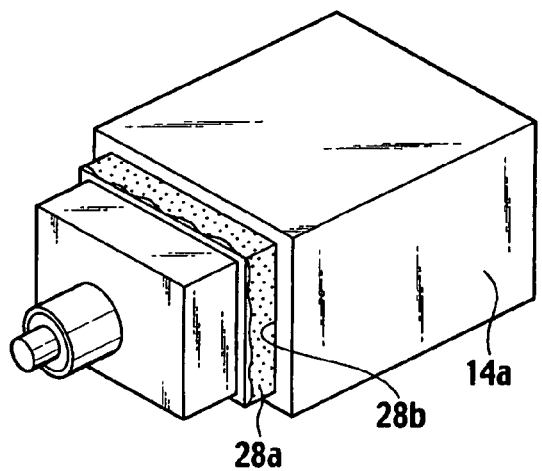

In FIGS. 6B and 6C, the body coated with the silver paste 28a is inserted into the cathode case 14a having the silver adhesive 28b, so that the silver adhesive 28b is laid over the silver paste 28a. Thereafter, the silver paste 28a and silver adhesive 28b are simultaneously hardened, to integrate the silver paste and adhesive 28a and 28b into the single cathode conductive layer 26 containing silver particles. This results in connecting the solid electrolytic layer 24 to the cathode case 14a. The anode terminal 16 is connected to the anode lead 20a of the anode 20. These operations are carried out in process (e) of FIG. 5. Lastly, process (f) of FIG. 5 airtightly covers the product with the resin sheath 18.

EXAMPLE 1

Example 1 forms a solid electrolytic capacitor A1 according to the present invention. The capacitor A1 has an anode 20 made of a tantalum sintered body. The anode is oxidized in a phosphoric acid aqueous solution, to form a dielectric oxide film 22. On the dielectric oxide film, a solid electrolytic layer 24 is formed from polypyrrole (conductive polymer). On the solid electrolytic layer, a conductive carbon paste layer 27 is formed and dried for 30 minutes at 150° C.

Silver paste 28a and silver adhesive 28b are made of the same material containing silver particles, binder resin, and a solvent of 10 wt %. The ratio of silver particles to resin is 9:1. The binder resin is epoxy resin and the solvent is NMP (N-methyl-2-pyrrolidone). The silver particles have an average diameter of 5 μm.

The silver paste and silver adhesive are simultaneously hardened by drying them for 90 minutes at 150° C. Sectional SEM observation of the solid electrolytic capacitor A1 will be explained.

FIG. 4D is a SEM photograph showing a section of the solid electrolytic capacitor A1 according to the example 1 of the present invention. As is apparent in the SEM photograph, the cathode conductive layer 26 has a single-layer structure containing silver particles. The example 1 employs the same material for the silver paste and silver adhesive, and therefore, silver particles are substantially uniformly distributed through the single cathode conductive layer 26.

The cathode conductive layer 26 of the solid electrolytic capacitor A1 has a density of 12 g·cm$^{-3}$. The density is calculated as follows:

Density(g·cm$^{-3}$)=(Quantity of silver paste and adhesive excluding solvent)/(Contact area between cathode conductive layer and cathode terminal multiplied by thickness of cathode conductive layer shown in SEM photograph of FIG. 4D)    (1)

COMPARATIVE EXAMPLE 1

Comparative example 1 is an example of a related art that forms a solid electrolytic capacitor X1 like the example 1 of the present invention except that it separately hardens silver paste and silver adhesive. Namely, the comparative example 1 forms a silver paste layer 43 on a conductive carbon layer 27 and hardens the layer 43 by drying the same for 30 minutes at 150° C. The comparative example 1 forms a silver adhesive layer 44 (not hardened yet) on the inner faces of a cathode case 14a, and into the cathode case, inserts the body having the hardened silver paste layer 43. Thereafter, the comparative example 1 dries the cathode case for 90 minutes at 150° C. to harden the silver adhesive layer 44.

FIG. 4C is a SEM photograph showing a section of the solid electrolytic capacitor X1 of the comparative example 1.

As is apparent from comparison between the SEM photograph of FIG. 4C of the comparative example 1 (related art) and that of FIG. 4D of the present invention, the cathode conductive layer 40 of the related art includes two layers, i.e., the silver paste layer 43 and silver adhesive layer 44. According to the present invention, the cathode conductive layer 26 has a single-layer structure with the integrated silver paste 28a and silver adhesive 28b.

As mentioned above, the cathode conductive layer 40 of the related art has the two-layer structure of the silver paste layer 43 and silver adhesive layer 44, and the cathode conductive layer 26 of the present invention has a single-layer structure containing metal particles. These structures are verifiable from sectional profiles.

To measure sectional profiles, the solid electrolytic capacitor X1 of the related art and the solid electrolytic capacitor A1 of the present invention are sealed with epoxy resin. After curing the epoxy resin, the capacitors are polished to expose sections thereof.

To measure sectional profiles, a confocal laser scanning microscope (Olympus OLS1100) is used. A sectional profile of the solid electrolytic capacitor X1 of the related art is measured in Y-direction around an interface between the silver paste layer 43 and the silver adhesive layer 44 shown in FIG. 4C. A sectional profile of the solid electrolytic capacitor A1 of the present invention is measured in Y-direction around the cathode conductive layer 26 shown in FIG. 4D.

FIG. 7A shows the sectional profile of the related art. As is apparent in FIG. 7A, the solid electrolytic capacitor X1 of the related art involves recesses along the interface between the silver paste layer 43 and the silver adhesive layer 44. As explained above, the related art forms the silver paste layer 43, and thereafter, lays the silver paste layer 43 on a silver adhesive. Then, the related art hardens the silver adhesive to form the silver adhesive layer 44. During the hardening of the silver adhesive, the concentration of a solvent in the silver adhesive increases along the interface, to form many voids along the interface. Polishing the solid electrolytic capacitor X1 for measuring the sectional profile thereof exposes the voids, and this is the reason why the recesses are observed in FIG. 7A along the interface.

According to the solid electrolytic capacitor X1 of the related art, the voids along the interface between the silver paste layer 43 and the silver adhesive layer 44 decreases a concentration of silver particles. This is the reason why the cathode conductive layer 40 of the solid electrolytic capacitor according to the related art has the two-layer structure.

In FIG. 7A, the silver adhesive layer 44 is lower in profile than the silver paste layer 43. This is because the anode in the solid electrolytic capacitor is harder than the other parts, and therefore, the silver adhesive layer 44 that is farther from the anode is more polished than the silver paste layer 43.

The solid electrolytic capacitor A1 according to the present invention shown in FIG. 7B has no recesses in the cathode conductive layer 26. Namely, the cathode conductive layer 26 contains no voids. This verifies that the cathode conductive layer 26 of the present invention has a single-layer structure.

ESR measurement on the solid electrolytic capacitor A1 of the present invention and the solid electrolytic capacitor X1 of the related art, i.e., the comparative example 1 will be explained. The measurement is carried out at a frequency of 100 kHz with an LCR meter. Table 1 shows measured ESR indexes with the ESR of the solid electrolytic capacitor X1 of the comparative example 1 being 100.

TABLE 1

| Solid electrolytic capacitor | ESR |
| --- | --- |
| A1 | 70 |
| X1 | 100 |

Table 1 shows that the ESR of the solid electrolytic capacitor A1 of the example 1 according to the present invention is about 30% smaller at the high frequency of 100 kHz than that of the solid electrolytic capacitor X1 of the comparative example 1.

EXAMPLE 2

Example 2 prepares solid electrolytic capacitors B1 to B8 like the example 1 but with silver paste and silver adhesive containing different quantities of solvent. More precisely, the solid electrolytic capacitors B1 to B8 are made with the use of silver paste and silver adhesive containing solvents of 3, 5, 8, 12, 15, 20, 30, and 40 wt %, respectively. The density of a cathode conductive layer of the solid electrolytic capacitor B1 with 3 wt % solvent is 16 g·cm$^{-3}$, that of B2 with 5 wt % solvent is 15 g·cm$^{-3}$, that of B3 with 8 wt % solvent is 14 g·cm$^{-3}$, that of B4 with 12 wt % solvent is 10 g·cm$^{-3}$, that of B5 with 15 wt % solvent is 7 g·cm$^{-3}$, that of B6 with 20 wt % solvent is 5 g·cm$^{-3}$, that of B7 with 30 wt % solvent is 4 g·cm$^{-3}$, and that of B8 with 40 wt % solvent is 3 g·cm$^{-3}$.

Table 2 shows ESRs of the solid electrolytic capacitors B1 to B8 measured like the example 1 at a frequency of 100 kHz with an LCR meter. In Table 2, the ESRs are indexes based on the ESR of the solid electrolytic capacitor X1 of the comparative example 1 being 100.

TABLE 2

| Solid electrolytic capacitor | Density of cathode conductive layer | ESR |
| --- | --- | --- |
| B1 | 16 | 91 |
| B2 | 15 | 81 |
| B3 | 14 | 76 |
| A1 | 12 | 70 |
| B4 | 10 | 72 |
| B5 | 7 | 74 |
| B6 | 5 | 76 |
| B7 | 4 | 81 |
| B8 | 3 | 91 |

To reduce ESR, Table 2 shows that the density of a cathode conductive layer must be preferably in the range of 4.0 g·cm$^{-3}$ to 15.0 g·cm$^{-3}$, more preferably, in the range of 5.0 g·cm$^{-3}$ to 14.0 g·cm$^{-3}$.

EXAMPLE 3

Example 3 examines the effect of a cathode case on ESR. Solid electrolytic capacitors C1, C2, and C3 are prepared like the example 1 with cathode conductive layers thereof being connected to two, three, and four inner faces (cathode faces) of cathode cases, respectively. Table 3 shows ESRs of the solid electrolytic capacitors C1, C2, and C3 measured like the example 1 at a frequency of 100 kHz with an LCR meter. In Table 1, the ESRs are indexes relative to the ESR of the solid electrolytic capacitor X1 of the comparative example 1 that is set as 100.

TABLE 3

| Solid electrolytic capacitor | Number of contact faces of cathode terminal | ESR |
|---|---|---|
| C1 | 2 | 70 |
| C2 | 3 | 70 |
| C3 | 4 | 70 |
| A1 | 5 | 70 |

Table 3 verifies a preferable effect of the present invention that there is no increase in ESR at the high-frequency of 100 kHz even if the number of cathode faces of a cathode case connected to the cathode conductive layer varies.

The silver paste and silver adhesive used in the above-mentioned embodiments and examples are made of the same material. They may be made of different materials. Even with the different materials, the present invention can form a single cathode conductive layer to realize the ESR reducing effect mentioned above.

In this way, the solid electrolytic capacitor according to the present invention includes a cathode conductive layer having a single-layer structure containing metal particles. Compared with the conventional solid electrolytic capacitor including a two-story cathode conductive layer made of a conductive paste layer and a conductive adhesive layer between which an interface exists, the solid electrolytic capacitor of the present invention can reduce ESR in high-frequency regions and improve high-frequency characteristics.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A solid electrolytic capacitor comprising: an anode made of valve action metal;
    a dielectric layer covering the anode;
    a solid electrolytic layer covering the dielectric layer;
    a carbon layer covering the solid electrolytic layer;
    a cathode conductive layer covering the carbon layer; and
    a cathode terminal electrically connected to the cathode conductive layer, wherein the cathode conductive layer that is formed between the carbon layer and the cathode terminal is a single layer containing metal particles, and the carbon layer contacts the cathode conductive layer and the cathode terminal contacts the cathode conductive layer.

2. The solid electrolytic capacitor as claimed in claim 1, wherein:
    the cathode terminal includes a plurality of cathode faces and the cathode conductive layer is electrically connected to the cathode faces.

3. The solid electrolytic capacitor as claimed in claim 2, wherein:
    the cathode terminal includes a cathode case having inner faces on which the cathode faces are formed.

4. The solid electrolytic capacitor as claimed in claim 3, wherein:
    the cathode conductive layer is formed that the solid electrolytic layer coated with a conductive paste is inserted into the cathode case applied a conductive adhesive inside, and then the conductive paste and the conductive adhesive are simultaneously hardened.

5. The solid electrolytic capacitor as claimed in claim 1, wherein:
    the cathode terminal comprises a cathode case which is containable of the anode, the dielectric layer, and the solid electrolytic layer.

6. The solid electrolytic capacitor as claimed in claim 5, wherein:
    the cathode conductive layer is a conductive film formed between the solid electrolytic layer and the cathode terminal.

7. The solid electrolytic capacitor as claimed in claim 5, wherein:
    the cathode conductive layer is formed by hardening a conductive paste coating the solid electrolytic layer and the conductive adhesive applied inside of the cathode case together.

8. The solid electrolytic capacitor as claimed in claim 7, wherein:
    a density of metal particles of the conductive paste and the conductive adhesive thereof are essentially the same.

9. The solid electrolytic capacitor as claimed in claim 1, wherein:
    the cathode conductive layer contains particles of at least one selected from the group consisting of gold, silver, copper, platinum, tin, indium, palladium, nickel, and an alloy thereof.

10. The solid electrolytic capacitor as claimed in claim 1, wherein:
    the cathode conductive layer has a density in the range of 4.0 g·cm−3 to 15.0 g·cm−3.

11. The solid electrolytic capacitor as claimed in claim 1, wherein:
    the cathode conductive layer has a density in the range of 5.0 g·cm−3 to 14.0 g·cm−3.

12. A method of manufacturing a solid electrolytic capacitor, comprising:
    forming a dielectric layer over an anode made of valve action metal;
    forming a solid electrolytic layer over the dielectric layer;
    forming a carbon layer by hardening a conductive film formed between the solid electrolytic layer and a cathode terminal;
    forming a cathode conductive layer covering the carbon layer; and
    connecting a cathode terminal to the cathode conductive layer, wherein the cathode conductive layer that is formed between the carbon layer and the cathode terminal is a single layer containing metal partials, and the carbon layer contacts the cathode conductive layer and the cathode terminal contacts the cathode conductive layer.

13. The method as claimed in claim 12, wherein forming a cathode conductive layer comprises:
    applying conductive paste to the solid electrolytic layer;
    applying conductive adhesive to the cathode terminal;
    arranging the conductive adhesive on the conductive paste; and
    simultaneously hardening the conductive paste and the conductive adhesive.

14. The method as claimed in claim 13, wherein:
    the conductive paste and conductive adhesive are made of the same material.

15. The method as claimed in claim 12, further comprising:
forming a plurality of cathode faces on the cathode terminal; and
connecting the cathode conductive layer to the plurality of cathode faces.

16. The method as claimed in claim 12, wherein:
the cathode terminal comprises a cathode case which is containable of the anode, the dielectric layer, and the solid electrolytic layer.

17. The method as claimed in claim 16, wherein:
the cathode conductive layer is formed by hardening a conductive paste coating the solid electrolytic layer and a conductive adhesive applied inside of the cathode case together.

18. The method as claimed in claim 12, wherein:
the cathode conductive layer contains particles of at least one selected from the group consisting of gold, silver, copper, platinum, tin, indium, palladium, nickel, and an alloy thereof.

19. The method as claimed in claim 12, wherein:
the cathode conductive layer has a density in the range of 4.0 g·cm−3 to 15.0 g·cm−3.

20. The method as claimed in claim 12, wherein:
the cathode conductive layer has a density in the range of 5.0 g·cm−3 to 14.0 g·cm−3.

* * * * *